(12) United States Patent
Burgmeier et al.

(10) Patent No.: US 9,441,770 B2
(45) Date of Patent: Sep. 13, 2016

(54) MEDIA DISTRIBUTION APPARATUS

(71) Applicant: KRONES AG, Neutraubling (DE)

(72) Inventors: Berthold Burgmeier, Dischingen/Eglingen (DE); Franz Braun, Schwandorf (DE)

(73) Assignee: Krones AG (DE)

( * ) Notice: Subject to any disclaimer, the term of this patent is extended or adjusted under 35 U.S.C. 154(b) by 367 days.

(21) Appl. No.: 14/070,813

(22) Filed: Nov. 4, 2013

(65) Prior Publication Data

US 2014/0054865 A1 Feb. 27, 2014

Related U.S. Application Data

(62) Division of application No. 12/202,633, filed on Sep. 2, 2008, now Pat. No. 8,573,268.

(30) Foreign Application Priority Data

Sep. 1, 2007 (DE) ........................ 10 2007 041 684

(51) Int. Cl.
*F16L 21/00* (2006.01)
*F16C 33/74* (2006.01)
*B67C 3/22* (2006.01)
*B01F 13/10* (2006.01)

(52) U.S. Cl.
CPC ............ *F16L 21/00* (2013.01); *B01F 13/1055* (2013.01); *B67C 3/22* (2013.01); *F16C 33/74* (2013.01)

(58) Field of Classification Search
CPC ..... F16C 33/74; F16L 21/00; B01F 13/1055; B67C 3/22
USPC .................................. 141/144–147; 384/130
See application file for complete search history.

(56) References Cited

U.S. PATENT DOCUMENTS

| 1,487,414 | A | | 3/1924 | Weatherhead | |
|---|---|---|---|---|---|
| 2,169,573 | A | | 8/1939 | Vogt | |
| 2,372,899 | A | | 4/1945 | Kantor | |
| 2,638,259 | A | | 5/1953 | Garrett | |
| 2,761,605 | A | * | 9/1956 | Pahl | B65B 3/323 141/140 |
| 4,153,102 | A | | 5/1979 | Stockman | |
| 4,556,239 | A | * | 12/1985 | Eriksson | F04D 29/043 384/130 |
| 4,840,138 | A | * | 6/1989 | Stirbis | B05C 5/0216 118/409 |
| 5,111,857 | A | * | 5/1992 | LaWarre, Sr. | B67C 3/22 141/144 |

(Continued)

FOREIGN PATENT DOCUMENTS

AU 482389 12/1975
DE 885 662 8/1953

(Continued)

OTHER PUBLICATIONS

China Office Action dated Dec. 11, 2013, issued in application No. 2012102864076.

*Primary Examiner* — Timothy L Maust
(74) *Attorney, Agent, or Firm* — Onello & Mello, LLP

(57) ABSTRACT

A sealing device with a bearing unit for a distribution apparatus for media may include a shaft sleeve arranged in a stationary manner and inside which at least one supply line for a medium can be guided and a housing rotatable with respect to the shaft sleeve and arranged radially outside the shaft sleeve with respect to a rotation axis of the housing. The bearing unit bears the housing such that it can rotate with respect to the shaft sleeve, and the bearing unit is offset with respect to the sealing device in the direction of the rotation axis.

19 Claims, 6 Drawing Sheets

(56) References Cited

U.S. PATENT DOCUMENTS

| | | | | |
|---|---|---|---|---|
| 5,240,049 A | * | 8/1993 | Chiari | B65B 1/385 141/144 |
| 5,417,260 A | * | 5/1995 | Perrier | B67C 3/206 141/140 |
| 5,904,356 A | | 5/1999 | Mundy | |
| 6,148,876 A | | 11/2000 | Corniani et al. | |
| 6,305,437 B1 | * | 10/2001 | Edwards | B65B 43/60 141/1 |
| 6,581,653 B2 | * | 6/2003 | Servadei | B67C 3/22 141/144 |
| 7,152,620 B2 | | 12/2006 | Baumgarten et al. | |
| 2007/0267049 A1 | | 11/2007 | Righetto | |

FOREIGN PATENT DOCUMENTS

| | | |
|---|---|---|
| DE | 1 902 049 | 8/1970 |
| DE | 296 20 323 U1 | 3/1997 |
| DE | 196 44 399 C1 | 3/1998 |
| DE | 2006000325 | 3/2006 |
| DE | 20 2006 000 325 U1 | 4/2006 |
| DE | 601 23 407 T2 | 1/2007 |
| WO | 2004/033300 A1 | 4/2004 |

* cited by examiner

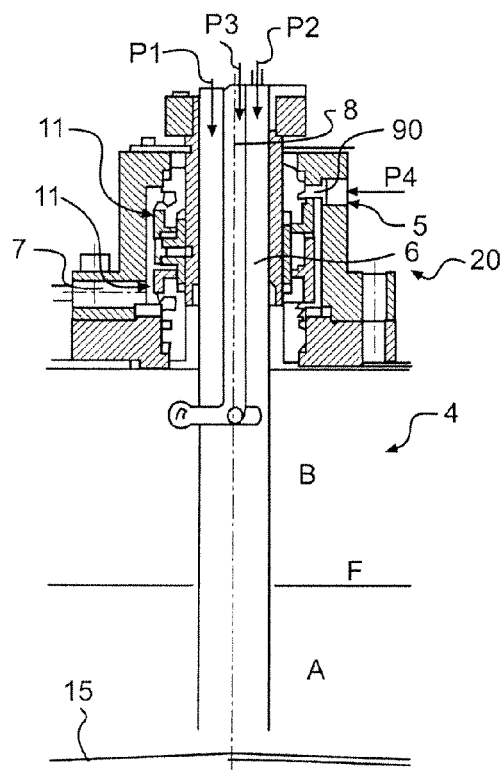 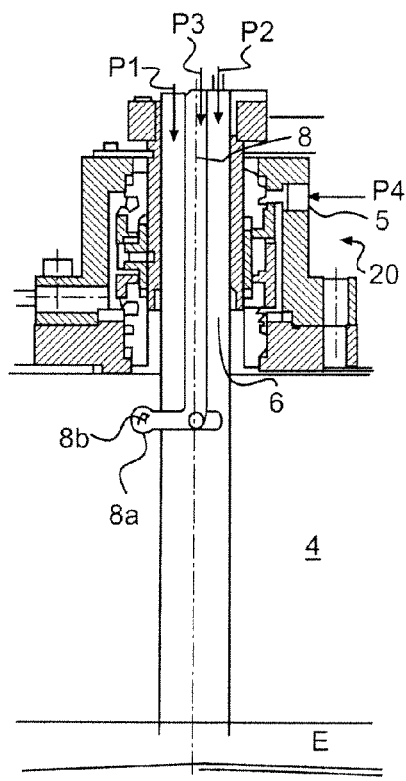
FIG. 2a  FIG. 2b

MEDIA DISTRIBUTION APPARATUS

CROSS-REFERENCE TO RELATED APPLICATION

This application is a divisional of U.S. application Ser. No. 12/202,633, filed Sep. 2, 2008, pending, which claims the benefit of priority of German Patent Application No. 10 2007 041 684.0, filed Sep. 1, 2007, pursuant to 35 U.S.C. 119(a)-(d), the disclosures of which are incorporated herein by reference in their entirety as if fully set forth herein.

TECHNICAL FIELD

The present disclosure relates to a distribution apparatus for media, and in particular for beverages, and also to a sealing device which can be used for such a distribution apparatus.

BACKGROUND

In the beverage-producing industry, distribution vessels for beverages are known from the prior art which distribute the beverage in question from a vessel into a plurality of individual filling devices, so that these filling devices can in turn introduce the beverage into the containers to be filled.

It is also known that, besides the beverage to be filled, a second medium and in particular a gas is also introduced into the corresponding distribution vessels. Like the beverage, this gas is sterile and serves for topping up in a sterile manner and therefore keeping sterile the space by which the filling level of the beverage is lowered. Such apparatuses are in part arranged on carousels, so that some elements of these apparatus are arranged such that they can rotate with respect to others.

DE 1 902 048 discloses a supply line for liquids and gases in filling machines. Here, a central liquid tube is provided which transports the liquid to be filled in the direction of distribution tubes arranged thereabove. These distribution tubes in turn convey the liquid into the individual containers.

DE 196 44 399 C1 describes an apparatus for cleaning coaxially arranged filler outer plates. Here, a ring-shaped rotary duct is provided which rotates about the filling axis and has spray nozzle systems arranged thereon.

DE 296 20 323 U1 discloses a rotary distributor for rotating container filling machines. This rotary distributor has supply lines which can rotate together with a ring-shaped vessel. Via a plurality of annular grooves, a beverage and a gas are supplied to the ring-shaped vessel via a stationary element.

This apparatus operates in a satisfactory manner, but a high sealing complexity is required in order to supply the liquid and the gas in supply lines.

DE 601 23 407 T2 describes a seal for a rotary coupling between a liquid distribution tube and a rotating vessel in filling installations. Here, a supply line is provided which has a stationary portion and a portion which can rotate with respect thereto.

It may therefore be desirable to improve the filling reliability of the media distributors known from the prior art. In addition, the manufacturing complexity for the media distributors to be manufactured should be reduced.

SUMMARY OF THE INVENTION

A distribution apparatus according to the invention for media and in particular for beverages comprises a vessel which is suitable for holding the media. Also provided is a first supply line which supplies the vessel with a first, preferably liquid medium, and a second supply line which supplies the vessel with a second, preferably gaseous medium.

According to the invention, the first supply line and the second supply line are arranged in a stationary manner with respect to one another and the vessel is arranged such that it can rotate with respect to the first supply line and the second supply classification, wherein the first supply line and the second supply line open into the vessel in a region of the latter which is always above a maximum filling level of the first liquid medium, i.e. regardless of a filling state of the vessel.

The vessel is in particular an add-on vessel, from which the individual containers to be filled are filled. The first liquid medium is preferably the beverage to be filled, and the second medium is a sterile gas, in particular sterile air, sterile nitrogen ($N_2$) or carbon dioxide ($CO_2$). The supply lines here are to be understood to mean in particular those supply lines which introduce the media directly into the vessel. Preferably, these supply lines protrude at least partially into the vessel. In a further advantageous embodiment, at least one sealing device is provided which seals off the supply lines with respect to the vessel, wherein the sealing device is not in contact with the first liquid medium. More specifically, no element of the sealing device is in contact with the first liquid medium. Here, the sealing device need not be arranged directly between the supply lines and the vessel, but rather it is also possible for further elements to be provided between the sealing device and the vessel.

As mentioned above, the vessel rotates with respect to the supply lines, with a seal being provided for this rotation process. According to the invention, therefore, two sterile media are jointly supplied via the distribution apparatuses. The fact that the sealing device is not in contact with the first liquid media means that it is possible to use just one sealing device for both media. By avoiding direct contact between the first medium and the sealing device, soiling of the sealing device by the first medium is also prevented. More specifically, the sealing device is preferably in contact only with the second medium, i.e. with the sterile gas, so that in this way no soiling of the sealing device can occur.

Preferably, the media are introduced into the vessel from above and the sealing device is arranged above the filling level of the first medium. In a further advantageous embodiment, the first supply line and the second supply line are arranged inside a tube. In this case, this tube is preferably connected to the first supply line and the second supply line in a rotationally fixed manner. Furthermore, it is also possible that one supply line is guided inside the other supply line. Preferably, the supply line for the gaseous medium is guided next to the supply line for the first medium and preferably also parallel thereto. However, it would also be possible for one supply line to be guided inside the other supply line.

In a further advantageous embodiment, the vessel is arranged such that it can rotate and therefore the supply lines are stationary. Via the rotatable vessel, it is in turn possible to supply the individual filling elements for the containers.

In a further advantageous embodiment, a separating medium is provided between the rotating components and the stationary components. This separating medium may preferably be hot steam, which forms a barrier so that the gaseous medium cannot escape out of the apparatus via the sealing device.

In a further advantageous embodiment, the separating medium is supplied via a connection, wherein this connection is arranged in a stationary manner. For this purpose, the apparatus preferably has a housing which is arranged in a stationary manner, and a supply line for the separating medium is provided in this housing.

Preferably, at least one supply line is designed as a tube which extends partially in the direction of the rotation axis of the vessel. In this case, preferably the first supply line for the liquid medium is designed to be rotationally symmetrical with respect to the rotation axis.

In a further advantageous embodiment, the sealing device is a sliding ring seal. Preferably, the sealing device comprises a shaft sleeve which is arranged in a stationary manner and inside which the supply lines are arranged.

In a further advantageous embodiment, at least one distributor head is provided at the outlet of the second supply line, which distributor head distributes the medium in a number of spatial directions. More specifically, this distributor head is designed to distribute or spray the gaseous medium inside the vessel in a number of spatial directions.

The present invention also relates to a sealing device with a bearing unit, in particular for an apparatus of the type described above. However, it is pointed out that the sealing device according to the invention can also be used for media distribution apparatuses which distribute only one medium.

The sealing device according to the invention with a bearing unit for a distribution apparatus for media comprises a shaft sleeve which is arranged in a stationary manner, wherein at least one supply line for a medium can be guided inside the shaft sleeve. Also provided is a housing which is arranged such that it can rotate with respect to the shaft sleeve and which is arranged radially outside the shaft sleeve with respect to a rotation axis of the housing. According to the invention, the bearing unit bears the housing such that it can rotate with respect to the shaft sleeve, wherein the bearing unit is offset with respect to the sealing device in the direction of the rotation axis.

While in the prior art the sealing devices and the bearing units are arranged at the same height, according to the invention the sealing device and the bearing unit are arranged offset with respect to one another. In this way, elements of the bearing unit, such as rolling bearings for example, are kept away from the area of the sealing device. The bearing unit here also performs the function of a very precise guide for the sealing device, or more specifically of a very precise guide for the housing with respect to the shaft sleeve.

Preferably, the bearing unit is arranged above the sealing device, with this embodiment being particularly of interest for distribution apparatuses of the type described above.

Advantageously, the bearing unit is spaced apart from the sealing device in the direction of the rotation axis by means of connecting pins. By virtue of these connecting pins, space can be obtained for accommodating channels, for example for guiding a barrier medium for the sealing device. Preferably, the sealing device is a sliding ring seal. All the elements of this sliding ring seal are preferably spaced apart from the bearing unit by the connecting pins.

Preferably, a barrier medium can be guided between the shaft sleeve and the housing in a radial direction with respect to the rotation axis.

Advantageously, a distributor block is arranged below the sealing device, which distributor block guides the medium in the radial direction with respect to the rotation axis. In this embodiment, the sealing device is particularly of interest for use in blowing devices for containers.

Finally, the present invention relates to a distribution apparatus for media of the type described above comprising a sealing device with a bearing unit of the type described above.

Further advantages and embodiments arise from the enclosed drawings.

BRIEF DESCRIPTION OF THE DRAWINGS

FIG. 2a shows a partial view of the arrangement of FIG. 1 during the production process;

FIG. 2b shows a partial view of the arrangement of FIG. 1 and of a cleaning process;

FIG. 5b shows a sectional view of the apparatus of FIG. 5a along the line A-A in FIG. 5a;

FIG. 5c shows a sectional view along the line B-B in FIG. 5a;

FIG. 5d shows a sectional view along the line C-C in FIG. 5a;

FIG. 5e shows a perspective view of the apparatus of FIG. 5a;

FIG. 6b shows a sectional view of the sealing device of FIG. 6a along the line A-A in FIG. 6a;

FIG. 6c shows a sectional view along the line B-B in FIG. 6a;

FIG. 6d shows a sectional view along the line C-C in FIG. 6a;

FIG. 6e shows a perspective view of the apparatus of FIG. 6a;

FIG. 7b shows a sectional view of the sealing device of FIG. 7a along the line A-A in FIG. 7a;

FIG. 7c shows a sectional view along the line B-B in FIG. 7a;

FIG. 7d shows a sectional view along the line C-C in FIG. 7a;

FIG. 7e shows a perspective view of the apparatus of FIG. 7a; and

DETAILED DESCRIPTION

Figure 1:
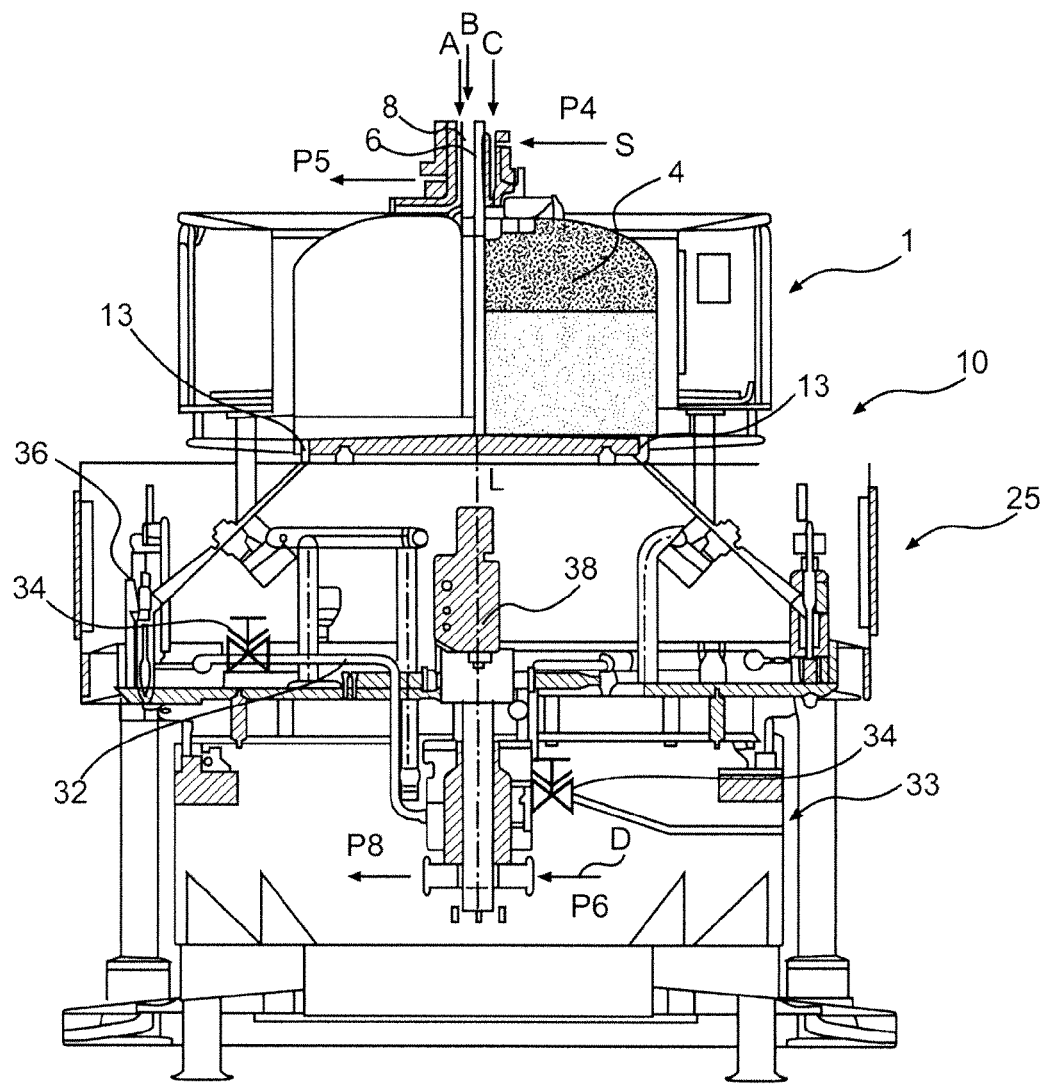
FIG. 1 shows an arrangement according to the invention for distributing media.

FIG. 1 shows an arrangement 10 according to the invention for distributing media. Here, as shown by the arrows, the product A to be filled, i.e. the beverage, and also a sterile gas B, such as e.g. sterile air or sterile carbon dioxide, are filled into a vessel 4 from above. A barrier medium S, such as e.g. steam, is channelled through a sealing device (explained in detail below) of the apparatus in the direction of the transversely running arrows P4, P5. The left-hand side of the figure illustrates a cleaning mode and the right-hand side illustrates a production mode. Reference C denotes a cleaning fluid.

Reference 13 denotes an outlet in the vessel 4, via which the beverage can be released during the production process (and via which a cleaning agent can be released during the cleaning process). Starting from this outlet 13, the beverage passes via filling devices 36 into the containers to be filled. The individual filling devices 36 are arranged here such that they can rotate, as is the vessel 4.

During the cleaning process, the cleaning fluid is likewise guided through the openings 13 and the filling devices 36, but then is conveyed away via a discharge line 32. Two aseptic valves 34 are closed during beverage production. Reference 33 denotes a rotating spray head (shown only schematically) for the cleaning operation. The cleaning medium C passes back out of the arrangement in the direction of the arrow P8, and a further cleaning agent D can be supplied in the direction of the arrow P9 for cleaning the isolator.

According to the invention, therefore, a distribution device is proposed for two sterile media together, wherein, as mentioned above, only one sealing device is required for both media.

FIG. 2*a* shows a detail view of the apparatus 1 of FIG. 1, more specifically a sealing device 20, during the production of beverages. Here, the sterile beverage is introduced in the direction of the arrows P1 and P2, i.e. via the supply line 6, and is superposed with a sterile gas in the direction of the arrow P3, i.e. the second supply line 8. Via a steam supply 5, the distribution device is supplied with steam, which acts as the barrier medium. Here, the inlet 5 is arranged in a stationary region of the distribution device. Via an outlet 7, the steam is released again from the sealing device 20, wherein a sensor device for determining the temperature of the steam may be arranged at this outlet 7.

Reference 11 denotes, in their entirety, mechanical sealing elements which may be made for example from graphite or SIC. Inside the vessel 4 (shown only schematically), reference F denotes the filling level of the sterile product A, and the gaseous medium B, i.e. the sterile gas, is arranged above the sterile product. Reference 15 denotes a buffer vessel for the product, which is arranged at the top of the filling device 25 (cf. FIG. 1). This buffer vessel 15 prevents air from entering the filling device 25 in the event of a low filling level of the medium A. As mentioned above, the vessel 4 is arranged such that it can rotate about an axis L.

FIG. 2*b* relates to the apparatus of FIG. 1 in a cleaning mode. Here, hot water for cleaning the spray heads 8*b*, which are arranged at the end 8*a* of the second supply line 8, is introduced in the direction of the arrow P3. Accordingly, hot water for filling the buffer vessel 15 can also be introduced in the direction of the arrow P2. Sterile air can be introduced in the direction of the arrow P1, in order to pressurise the buffer chamber 15.

Provided inside the vessel 4 in the cleaning mode is hot water which has been sprayed through the stationary spray balls. Hot water under pressure is located in a lower region E.

It can be seen in FIGS. 2*a* and 2*b* that the sealing device 20 in its entirety is always arranged above the level F of the liquid. The sealing device for the sterile distributor can thus be designed in a manner similar to a mechanical seal for stirrers. Furthermore, a complete sealing effect is achieved throughout all pressure stages, along with pressure-independent sealing. The product A to be filled is also prevented from coming into contact with hot surfaces, more specifically hot surfaces caused by the steam barrier. The sealing device 20 in the upper region of FIG. 1 and the non-sterile filling device 25 are separate units.

A cleaning of the buffer vessel 15 takes place via the first supply line 6 and the spray balls 8*b*. The cleaning may be carried out for example firstly by rinsing with water, then a hot alkaline cleaning operation, a further rinsing with water, if necessary, a subsequent acidic hot cleaning operation and finally a further rinsing with water.

An SIP (sterilisation in place) cleaning operation is also possible. This may take place by the buffer vessel being sprayed with pressurised hot water through the spray balls 8*b*, wherein this overpressure, as mentioned above, is achieved by the sterile air through the first supply line 6. Sterilisation is also possible by overfilling the buffer vessel with pressurised hot water, wherein the hot water is introduced via the first supply line (the product line) and is discharged via the spray balls 8*b* (in order to remove air from the buffer vessel 15).

Finally, a sterilisation by flushing with pressurised steam is also possible, wherein here the steam is introduced via the first supply line and the spray balls.

Figure 3:
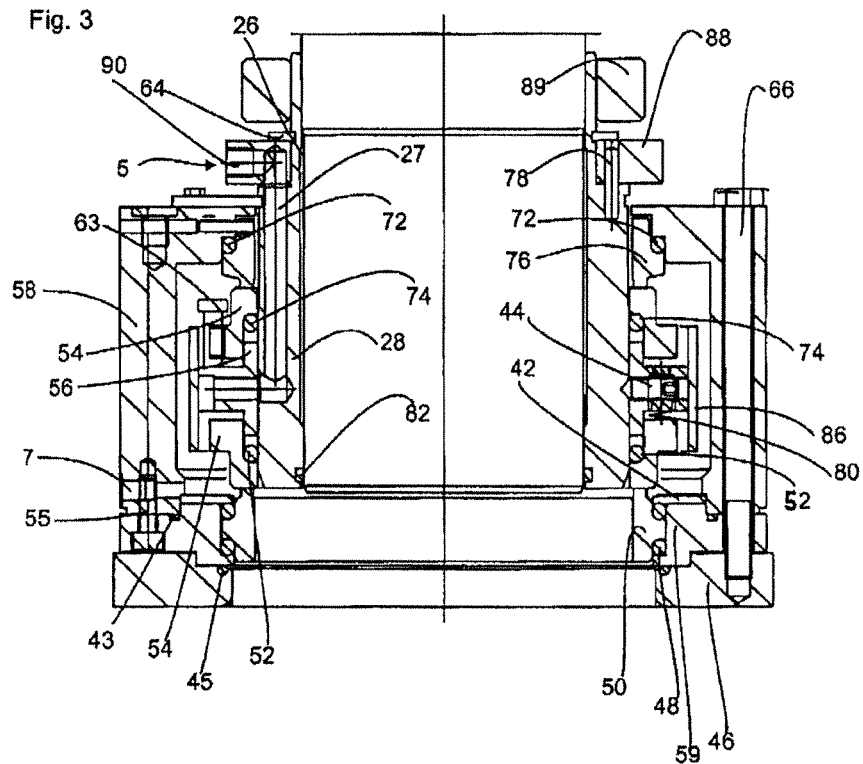
FIG. 3 shows a sealing device of the distribution apparatus according to the invention.

FIG. 3 shows a sealing device in the form of a sliding ring seal 20 for the apparatus of FIG. 1. The sliding ring seal 20 is arranged here above the vessel 4. The sliding ring seal comprises a sleeve or a shaft sleeve 28. This shaft sleeve 28 is arranged in a stationary manner and the two supply lines (not shown) for the media A and B are arranged inside the shaft sleeve. Reference 82 denotes an O-ring for sealing off the shaft sleeve 28 with respect to a tube 26.

Two sliding rings 54 are arranged on the shaft sleeve 28 by means of two O-rings 74, 52. These sliding rings are supported against an adjusting ring 56 by means of a spring 80. Reference 86 denotes a guiding sleeve which is arranged opposite the sliding rings 54. Reference 44 denotes a threaded pin for arresting the adjusting ring 56. Reference 88 denotes a connection ring which is arranged fixedly on the shaft sleeve 28 by means of a cylindrical pin 78.

A shrink disc 89 is provided above this connection ring 88. Both the shaft sleeve 28 and also the sliding rings 54, the connection ring 88 and the shrink disc 89 are arranged in a stationary manner. Via a connection 90 (which acts as the inlet 5, see FIGS. 2*a*, 2*b*), a barrier medium and in particular steam is supplied to the sliding ring seal through a channel 27. Here, the channel 27 is arranged in the shaft sleeve 28. The inlet for the steam is thus also arranged in a stationary manner. Reference 76 denotes a counter-ring which is supported against a housing 58 by means of an O-ring 72. This housing 58 is in turn arranged on the edge 46 (not shown in any greater detail) of the vessel in a rotationally fixed manner by means of a hexagon screw 66. Reference 50 denotes a further counter-ring which is supported against a flange 59 by means of O-rings 48, this flange 59 being arranged on the housing 58. References 43 and 45 likewise denote O-rings, and reference 55 denotes a cylindrical screw for fixing the flange 59 to the housing 58. Reference 63 denotes a further cylindrical screw.

The steam outlet 7 is preferably offset in height terms with respect to the illustrated steam inlet 5 and may also be offset in the circumferential direction by a predefined angle with respect to the inlet.

The housing 58 and the two counter-rings 50 and 76 are arranged such that they can rotate together with the vessel.

Figure 4:
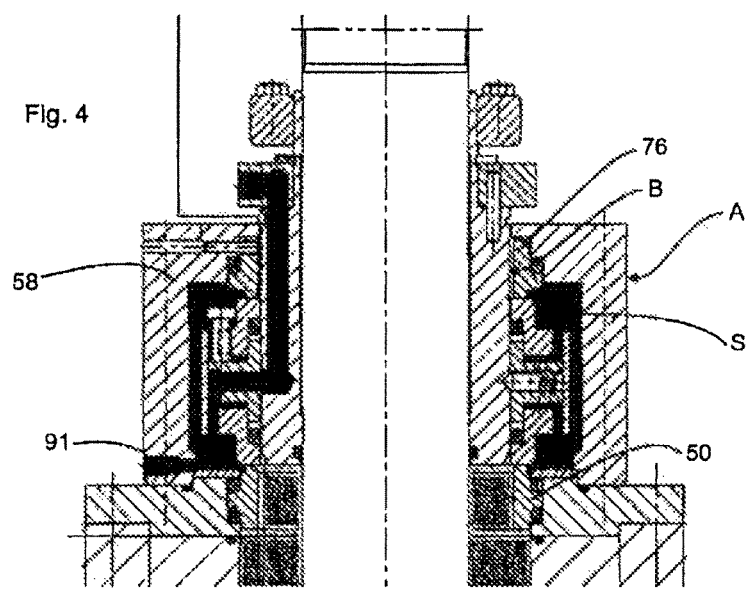
FIG. 4 shows the sealing device of FIG. 3 taking account of a barrier medium.

As explained with reference to FIG. 4, the stationary parts and the rotating parts are separated by the barrier medium, which is for example steam. This barrier medium is marked in FIG. 4 by the black areas S. Located radially inside these black areas S are the stationary parts of the sliding ring seal and outside are the rotating parts, such as for example the housing 58 and the two counter-rings 50 and 76. FIG. 4 also shows that the outlet is arranged further out than the inlet, and more specifically that the outlet is provided in a rotating element, namely the housing 58.

It is therefore advisable to have a design of the sliding ring seal as a cartridge unit with a shaft sleeve 58 for generating an air cushion (at the same time a temperature insulator) between the internal distributor and the steam chamber. As shown, this shaft sleeve 58 also serves as a steam supply and return, since it is a stationary component, and furthermore a temperature input to the internal distributor (in which the two supply lines 68 are arranged) is prevented. Moreover, the bearing and the seal are also functionally separated, so that the bearing can be provided as a separate ready-to-install module above the sealing device. Due to the low rotational speeds and the low pressures, dry running of the sliding ring seal 20 is possible.

Figure 5A:
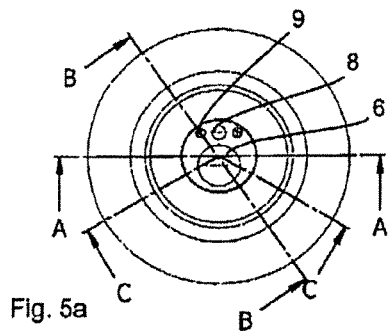
FIG. 5a shows a plan view of a sealing device with bearing unit.

FIG. 5a shows a plan view of a sealing device 20 with bearing unit according to the invention, wherein the vessel is not shown. Here, reference 6 denotes the first supply line for the medium A, reference 8 denotes the second supply line for the medium B and reference 9 denotes the supply line for the barrier medium S.

Figure 5C:
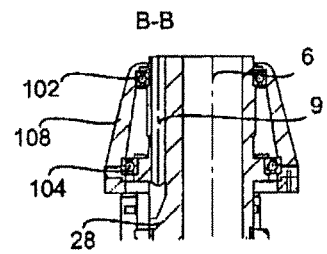
Figure 5B:
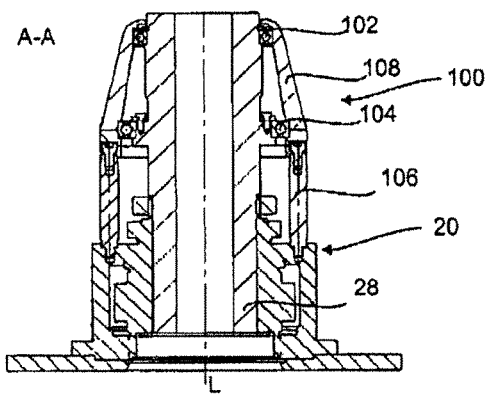

FIG. 5b shows a partial side view of the apparatus according to the invention along the line A-A in FIG. 5a. Here, reference 20 once again denotes the sliding ring seal 20 shown in detail in FIG. 3. A bearing unit 100 is provided above the sliding ring seal 20, in order to support the sliding ring seal with respect to the shaft sleeve 28. This bearing unit 100 comprises two rolling bearing units 102 and 104. The bearing device 100 is connected to the sliding ring seal 20 via connecting pins 106. In the region of the bearing unit 100, the two supply lines 6 and 8 and also the supply line 9 for the barrier medium S are parallel to one another, which allows a very small construction.

FIG. 5c shows a partial side view of the apparatus along the line B-B in FIG. 5a. It is possible to see here the supply line 9 for the barrier medium, which is arranged inside the sleeve 28.

It is also possible to see an obliquely running bearing housing 108, which serves for stabilising the apparatus as a whole.

Figure 5D:
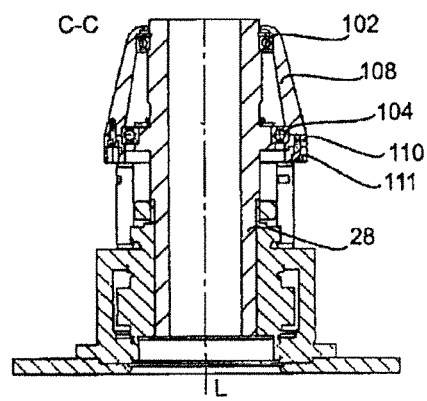

FIG. 5d shows a further side view of the apparatus according to the invention along the line C-C in FIG. 5a. It is possible to see here a retaining ring 110, which is screwed onto the bearing section 108 by means of screw connections 111.

Figure 5E:
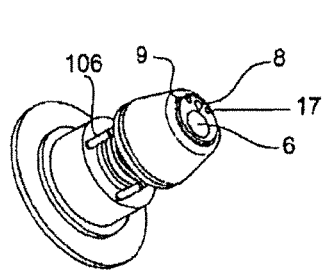

FIG. 5e shows a perspective view of the unit shown in FIG. 5b. It can be seen that, in addition to the three supply lines 6, 8 and 9, a further line 17 is provided. This further line 17 may be used for example for the return of the barrier medium.

Figure 6A:
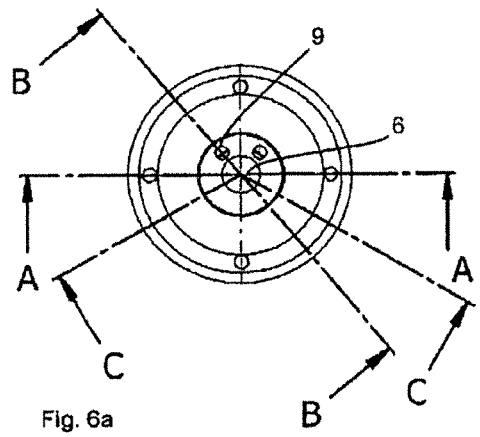
FIG. 6a shows a plan view of a sealing device with bearing unit in a further embodiment.

FIG. 6a shows a plan view of a sealing device with bearing unit according to the invention in a further embodiment. Some components of this sealing device are designed in the same way as the sealing device with bearing unit shown in FIG. 5a to FIG. 5e, so that reference is made to the above description in this respect.

The sealing device shown in FIGS. 6a-6e is designed for example for use in preheating and blowing units. The second supply line 8 is therefore not present here, but rather only a first supply line 6, through which however a gaseous medium, for example hot air or the like, is guided in the embodiment shown in FIGS. 6a-6e. As shown in FIG. 6a, this first supply line 6 is arranged centrally with respect to the sealing device 20 and the bearing unit 100.

Figure 6E:
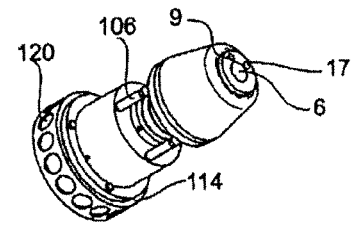
Figure 6C:
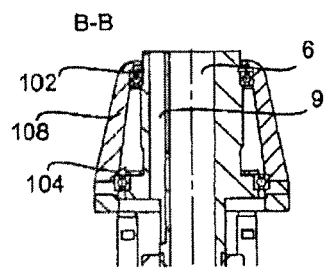
Figure 6D:
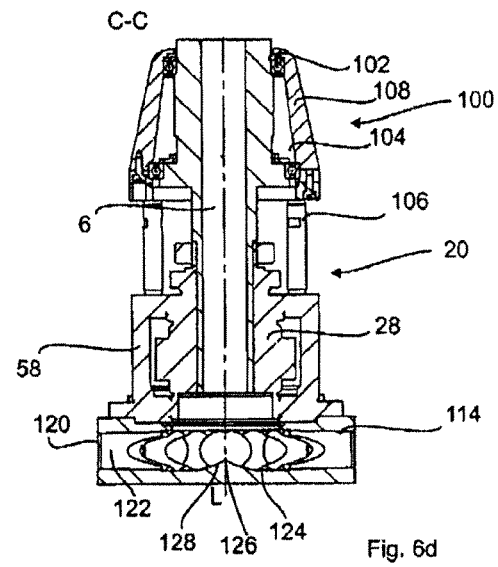
Figure 6B:
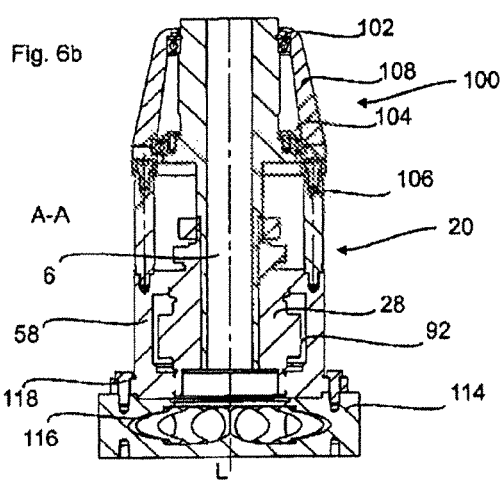

FIG. 6b shows a section through the bearing unit along the line A-A in FIG. 6a. It can also be seen here that the bearing unit 100 is spaced apart from the sealing device 20 via the connecting pins 106. In addition to the embodiment shown in FIGS. 5a-5e, the sealing device 20 with bearing unit 100 shown in FIGS. 6a-6e also has a distributor block 114, via which the medium passing through the supply line 6 is conveyed outwards in the radial direction. This distributor block 114 is arranged on the housing 58 or the flange 59 (FIG. 3) by means of connecting pins or screws 118 and rotates with this housing 58 during operation.

FIG. 6c shows a sectional view of the bearing unit 100 along the line B-B in FIG. 6a. It can be seen that the supply line 9 for the barrier medium S is also provided in this embodiment. In this connection, it is once again pointed out that the sealing device preferably has a chamber for the barrier medium S, said chamber being formed between the housing 28 and the shaft sleeve 28.

FIG. 6d shows a section through the sealing device 20 with bearing unit 100 along the line C-C in FIG. 6a. It can be seen here that the distributor block 114 has, in its interior, channels 122 running outwards in the radial direction. These channels 122 lead to openings 120 on the outer circumference of the distributor block 114. The individual channels 122 are distributed evenly with respect to the rotation axis L in the circumferential direction of the distributor block 114. Furthermore, the distributor device or the distributor block 114 has a base 124 which is curved in such a way that the medium impinging thereon through the supply line 6, which in particular is a gaseous medium, is urged towards the outside. More specifically, the base 124 has a peak 126 in its centre and slopes downwards and outwards from there in the radial direction. The medium is therefore deflected in terms of its flow direction in the distributor block 114. The peak 126 is adjoined by a curved portion 128, which likewise serves for guiding the medium.

FIG. 6e shows a perspective view of the sealing device 20 with bearing unit 100 shown in FIG. 6b. It can be seen here that the openings 120 are of circular shape and are arranged at equal spacings in the circumferential direction around the outer circumference of the distributor block 114. These openings 120 are adjoined by feed lines (not shown), which can in turn open into filling devices for containers.

Figure 7A:
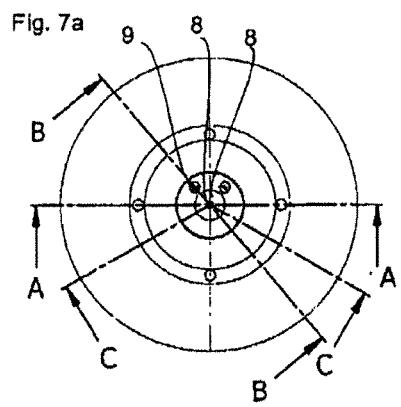
FIG. 7a shows a plan view of a sealing device with bearing unit in a further embodiment.
Figure 7E:
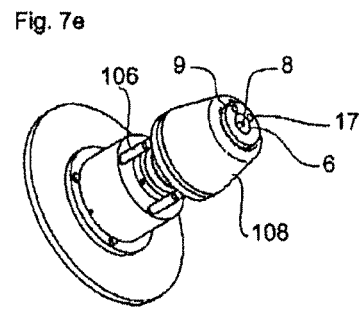
Figure 7C:
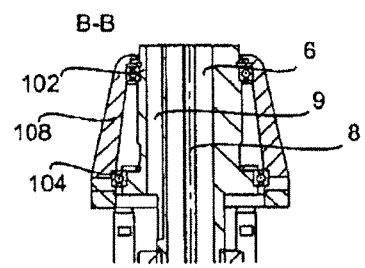
Figure 7D:
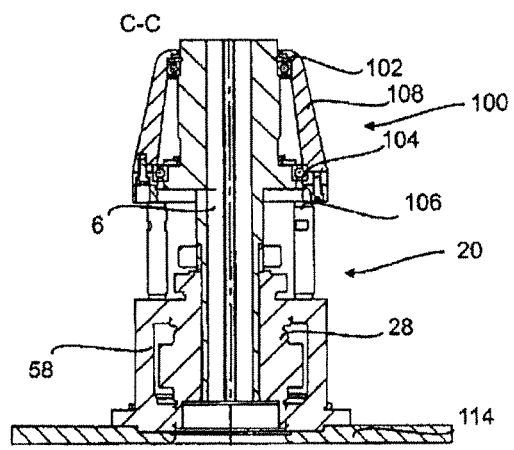
Figure 7B:
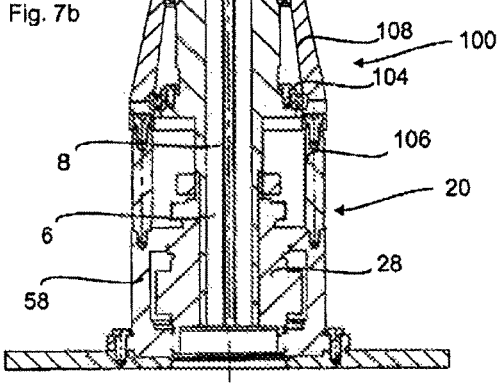

FIG. 7a shows a plan view of a further embodiment of a sealing device with bearing unit according to the invention. In this embodiment, the second supply line 8 runs inside the first supply line 6. More specifically, the first supply line 6 and the second supply line 8 are arranged coaxially with respect to one another and preferably also with respect to the rotation axis L, wherein the flow cross section of the first supply line 6 is much larger than the flow cross section of the second supply line 8. Otherwise, the embodiment shown in FIGS. 7a-7e corresponds substantially to the embodiment shown in FIGS. 5a-5e. It is also possible to see in the perspective view shown in FIG. 7e the second supply line 8, which is guided inside the first supply line 6. The embodiment shown in FIGS. 7a-7e may be provided for example for a sterile distributor for a steriliser.

Figure 8:
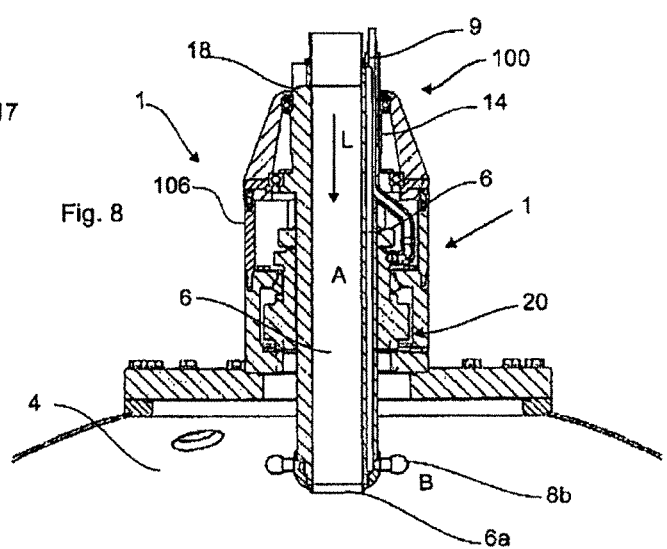
FIG. 8 shows the apparatus according to the invention in a further view.

FIG. 8 shows a detailed view of the sealing and bearing units 20, 100 shown in FIGS. 5a-5e, which are arranged on a vessel 4. It can be seen that the barrier medium, i.e. the steam, is firstly guided via the supply line 9 in the longitudinal direction L, then is diverted below the bearing 100 and finally is passed in the radial direction into the connection 90, which is also shown in FIG. 4. Reference 6a denotes one end of the first supply line 6, and reference 8b denotes spray heads which supply the vessel 4 with a sterile medium, i.e. preferably with sterile air, sterile nitrogen, carbon dioxide or the like.

It will be apparent to those skilled in the art that various modifications and variations can be made to the media distribution apparatus of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. Sealing device with a bearing unit for a distribution apparatus for media, the sealing device comprising:
   a shaft sleeve arranged in a stationary manner and inside which at least one supply line for a medium can be guided; and
   a housing rotatable with respect to the shaft sleeve and arranged outside the shaft sleeve in a direction perpendicular to a rotation axis of the housing,
   wherein the bearing unit bears the housing such that it can rotate with respect to the shaft sleeve, the bearing unit being offset with respect to the sealing device in the direction of the rotation axis.

2. Sealing device with a bearing unit according to claim 1, wherein the bearing unit is arranged above the sealing device.

3. Sealing device with a bearing unit according to claim 1, wherein the bearing unit is spaced apart from the sealing device in the direction of the rotation axis by means of connecting pins.

4. Sealing device with a bearing unit according to claim 1, wherein the sealing device is a sliding ring seal.

5. Sealing device with a bearing unit according to claim 1, wherein a barrier medium can be guided between the shaft sleeve and the housing in a radial direction with respect to the rotation axis.

6. Sealing device with a bearing unit according to claim 5, further comprising a distributor block below the sealing device, distributor block guiding the barrier medium in the radial direction with respect to the rotation axis.

7. Sealing device with a bearing unit according to claim 1, wherein the sealing device is not in contact with the medium.

8. Sealing device with a bearing unit according to claim 4, wherein the sliding ring seal is spaced apart from the bearing unit in the direction of the rotation axis.

9. Sealing device with a bearing unit according to claim 8, wherein the sliding ring seal is spaced apart from the bearing unit in the direction of the rotation axis by connecting pins.

10. Sealing device with a bearing unit according to claim 1, wherein two sliding ring seals are arranged on the shaft sleeve.

11. Sealing device with a bearing unit according to claim 10, wherein the two sliding ring seals are arranged on the shaft sleeve by means of two O-rings.

12. Sealing device with a bearing unit according to claim 10, wherein the two sliding ring seals are supported against an adjusting ring.

13. Sealing device with a bearing unit according to claim 12, wherein the two sliding ring seals are supported against the adjusting ring by means of a spring.

14. Sealing device with a bearing unit according to claim 12, wherein a threaded pin for arresting the adjusting ring is provided.

15. Sealing device with a bearing unit according to claim 4, wherein a connection is provided to supply a barrier medium to the sliding ring seal through a channel.

16. Sealing device with a bearing unit according to claim 15, wherein the channel is arranged in the shaft sleeve.

17. Sealing device with a bearing unit according to claim 1, wherein the bearing unit is offset with respect to the housing in the direction of the rotating axis.

18. Sealing device with a bearing unit according to claim 1, wherein the bearing unit is a guide for the sealing device.

19. Sealing device with a bearing unit according to claim 1, wherein the housing surrounds the sealing device.

* * * * *